United States Patent
Okuda et al.

(10) Patent No.: US 10,245,678 B2
(45) Date of Patent: Apr. 2, 2019

(54) MANAGEMENT METHOD OF POWDER SUPPLY HEAD, AND METHOD AND APPARATUS FOR FORMING EROSION SHIELD

(71) Applicant: MITSUBISHI HITACHI POWER SYSTEMS, LTD., Kanagawa (JP)

(72) Inventors: Takehisa Okuda, Tokyo (JP); Motonari Machida, Tokyo (JP); Yasuo Matsunami, Tokyo (JP)

(73) Assignee: MITSUBISHI HITACHI POPOWER SYSTEM, LTD., Kanagawa (JP)

( * ) Notice: Subject to any disclaimer, the term of this patent is extended or adjusted under 35 U.S.C. 154(b) by 452 days.

(21) Appl. No.: 15/123,506

(22) PCT Filed: Apr. 1, 2015

(86) PCT No.: PCT/JP2015/060314
§ 371 (c)(1),
(2) Date: Sep. 2, 2016

(87) PCT Pub. No.: WO2015/156180
PCT Pub. Date: Oct. 15, 2015

(65) Prior Publication Data
US 2017/0072509 A1    Mar. 16, 2017

(30) Foreign Application Priority Data

Apr. 7, 2014  (JP) .................................. 2014-078908

(51) Int. Cl.
*B23K 26/144*   (2014.01)
*B23K 26/14*    (2014.01)
(Continued)

(52) U.S. Cl.
CPC ............ *B23K 26/144* (2015.10); *B23K 26/03* (2013.01); *B23K 26/147* (2013.01); *B23K 26/34* (2013.01);
(Continued)

(58) Field of Classification Search
CPC .... B23K 26/144; B23K 26/03; B23K 26/147; B23K 26/34
(Continued)

(56) References Cited

U.S. PATENT DOCUMENTS 6,269,540 B1 * 8/2001 Islam ................. B23K 26/0604
29/889.7
7,020,539 B1 * 3/2006 Kovacevic ............ B22F 3/1055
483/16
(Continued)

FOREIGN PATENT DOCUMENTS

CN        1824453        8/2006
CN      101607348       12/2009
(Continued)

OTHER PUBLICATIONS

Written Opinion of the International Searching Authority dated Jun. 30, 2015 in International (PCT) Application No. PCT/JP2015/060314, with English translation.
(Continued)

*Primary Examiner* — Samuel M Heinrich
(74) *Attorney, Agent, or Firm* — Wenderoth Lind & Ponack, L.L.P.

(57) ABSTRACT

A management method of a powder supply head in which supplied cladding metal is stabilized, and a method and apparatus for forming an erosion shield. The powder supply head has a double tube that supplies the cladding metal to a cladding portion and includes an inner tube that sprays a cladding metal used for cladding by welding and an outer
(Continued)

tube that concentrically overlaps the inner tube and sprays a shielding air. The method including: spraying the cladding metal from the powder supply head to a test region; measuring a width of the cladding metal sprayed onto the test region; in a case where the measured width of the cladding metal is an allowance or smaller, determining that the powder supply head is usable, and in a case where the measured width of the cladding metal is greater than the allowance, determining that the powder supply head is unusable.

10 Claims, 9 Drawing Sheets

(51) Int. Cl.
  *B23K 26/34* (2014.01)
  *B23K 26/03* (2006.01)
  *F02C 7/00* (2006.01)
  *F01D 5/00* (2006.01)
  *B23K 101/00* (2006.01)
  *B23K 103/18* (2006.01)

(52) U.S. Cl.
  CPC .............. *F01D 5/005* (2013.01); *F02C 7/00* (2013.01); *B23K 2101/001* (2018.08); *B23K 2103/26* (2018.08); *F05D 2230/30* (2013.01); *F05D 2230/80* (2013.01); *F05D 2230/90* (2013.01)

(58) Field of Classification Search
  USPC .............. 219/121.6, 121.63, 121.64, 121.84, 219/121.85
  See application file for complete search history.

(56) References Cited

U.S. PATENT DOCUMENTS

| | | | |
|---|---|---|---|
| 7,827,883 B1* | 11/2010 | Cherng | B23K 26/34 76/107.8 |
| 8,049,132 B2 | 11/2011 | Bouet et al. | |
| 9,027,244 B2* | 5/2015 | Nebesni | B23K 26/0823 29/889.1 |
| 9,254,527 B2* | 2/2016 | Vaneecke | B23D 61/185 |
| 9,522,426 B2* | 12/2016 | Das | B22F 3/1055 |
| 2002/0046464 A1 | 4/2002 | Kanai | |
| 2006/0193612 A1 | 8/2006 | Bouet et al. | |
| 2009/0308847 A1 | 12/2009 | Kamimura et al. | |
| 2011/0168090 A1 | 7/2011 | Clark et al. | |
| 2014/0186549 A1 | 7/2014 | Miyagi et al. | |

FOREIGN PATENT DOCUMENTS

| | | |
|---|---|---|
| JP | 2-88241 | 3/1990 |
| JP | 10-280907 | 10/1998 |
| JP | 11-207484 | 8/1999 |
| JP | 2000-135580 | 5/2000 |
| JP | 2002-129920 | 5/2002 |
| JP | 2006-231409 | 9/2006 |
| JP | 2009-90349 | 4/2009 |
| JP | 2012-86241 | 5/2012 |
| JP | 2013-75308 | 4/2013 |
| JP | 2014-28397 | 2/2014 |

OTHER PUBLICATIONS

International Search Report dated Jun. 30, 2015 in International (PCT) Application No. PCT/JP2015/060314.
Office Action dated Mar. 30, 2017 in corresponding Chinese Application No. 201580012321.6, with English Translation.
Notification of Reason for Refusal dated Feb. 12, 2018 in Korean Application No. 10-2016-7024461, with English translation.

* cited by examiner

MANAGEMENT METHOD OF POWDER SUPPLY HEAD, AND METHOD AND APPARATUS FOR FORMING EROSION SHIELD

FIELD

The present invention relates to a management method of a powder supply head, and a method for forming an erosion shield, a method for producing a rotor blade, a powder supply head, and a cladding by welding apparatus.

BACKGROUND

In a general turbine (for example, steam turbine), a rotor as a rotating shaft is rotatably supported by a casing, rotor blades are installed on the outer circumferential portion of the rotor, stator vanes are disposed on the inner wall of the casing, and a plurality of the rotor blades and a plurality of the stator vanes are alternately disposed in a steam passage. In a process in which steam flows through the steam passage, the rotor blades and the rotor are driven to rotate.

The rotor blade includes a blade root portion fixed to a rotor disk of the rotor, a platform formed integrally with the blade root portion, and a blade portion which has a base end portion joined to the platform and extends toward the tip end portion. In addition, the base end portions of the plurality of rotor blades are fixed to the outer circumferential portion of the rotor disk so as to be arranged along the circumferential direction thereof.

For example, the rotor blades of the steam turbine rotate on a path on which steam flows. At this time, steam in the vicinity of the final stage of a low-pressure steam turbine contains a large amount of fine droplets. Therefore, due to the impacts of the water droplets at high speeds, the leading edge portion of the blade tip end in the rotor blade may be eroded and reduced in thickness.

As measures against erosion, for example, as described in Patent Literatures 1 and 2, there is a method for forming an erosion shield at the leading edge portion of the tip end of a rotor blade. In Patent Literature 1, an erosion shield is formed by cladding by welding through plasma transferred arc welding. In Patent Literature 2, it is described that powder of a hard material is melted through high-density energy irradiation (a laser or electron beam) and is subjected to cladding by welding to form a hard layer, and a portion of a member is locally replaced with the hard layer such that an erosion preventive portion (erosion shield) is provided.

CITATION LIST

Patent Literature

Patent Literature 1: Japanese Laid-open Patent Publication No. 10-280907 A
Patent Literature 2: Japanese Laid-open Patent Publication No. 2012-86241 A

SUMMARY

Technical Problem

As described in Patent Literature 1, when an erosion shield is formed through arc welding, there may be cases where defects are generated or hardness is insufficient. In addition, as described in Patent Literature 2, by forming an erosion shield by cladding processing by laser welding, the performance of the erosion shield can be enhanced.

Here, during the cladding processing by laser welding, there may be cases where the material of the erosion shield, that is, cladding metal used for cladding is sprayed from a tube provided in a head so as to be supplied. When the state of the supplied cladding metal supplied from a powder supply head provided with a tube for supplying the cladding metal varies, cladding processing may be affected. There is room for improvement in the powder supply head provided with the tube for supplying the cladding metal and the management of the powder supply head.

In order to solve the above-described problems, an object of the present invention is to provide a management method of a powder supply head in which the state of supplied cladding metal can be stabilized, a method for forming an erosion shield, a method for producing a rotor blade, a powder supply head, and a cladding by welding apparatus.

Solution to Problem

In one aspect, there is provided a management method of a powder supply head which has a double tube in which an inner circumference side tube that sprays a cladding metal used for cladding by welding and an outer circumference side tube that is disposed at an outer circumference of the inner circumference side tube and sprays a shielding air overlap concentrically, and supplies the cladding metal to a cladding portion, the method comprising: a spraying process of spraying the cladding metal from the powder supply head to a test region under set conditions; a width measurement process of measuring a width of the cladding metal sprayed onto the test region; a determination process of, in a case where the measured width of the cladding metal is an allowance or smaller, determining that the powder supply head is usable, and in a case where the measured width of the cladding metal is greater than the allowance, determining that the powder supply head is unusable.

In one aspect, in the inner circumference side tube, an end surface on a side where the cladding metal is sprayed is processed into a surface perpendicular to an axial direction of the inner circumference side tube.

In one aspect, the test region is provided with an adhesive material.

In one aspect, the management method of a powder supply head further comprises an oxygen concentration measurement process of measuring a concentration of oxygen of the test region during the spraying process, wherein in the determination process, in a case where the concentration of oxygen measured in the oxygen concentration measurement process is an allowance or lower, it is determined that the powder supply head is usable, and in a case where the measured concentration of oxygen is higher than the allowance, it is determined that the powder supply head is unusable.

In one aspect, a method for forming an erosion shield on at least one of a tip end and a blade surface of a rotor blade body, comprises: a process of forming a boundary by removing at least a portion of a tip end and an end surface of a base body which is to become the rotor blade; a process of forming a cladding portion through laser welding on the boundary using a powder supply nozzle which is determined to be usable in the management method of a powder supply head according to any one of claims 1 to 4; and a process of performing finish processing to remove an excess thickness portion of the base body and a portion of the cladding portion.

In one aspect, a method for producing a rotor blade comprises: a base body production process of forming a base body having an excess thickness portion in a rotor blade; and a process of forming an erosion shield on a blade body in the method for forming an erosion shield according to claim 5.

In one aspect, there is provided a powder supply head comprising: an inner circumference side tube which sprays a cladding metal used for cladding by welding; and an outer circumference side tube that is disposed to overlap concentrically with an outer circumference of the inner circumference side tube and sprays a shielding air, wherein, in the inner circumference side tube, an end surface on a side where the cladding metal is sprayed is a surface perpendicular to an axial direction of the inner circumference side tube.

In one aspect, a method for forming an erosion shield on at least one of a tip end and a blade surface of a rotor blade body, comprises: a process of forming a boundary by removing at least a portion of a tip end and an end surface of a base body which is to become the rotor blade; a process of forming a cladding portion through laser welding on the boundary using a powder supply nozzle having the powder supply head according to claim 7; and a process of performing finish processing to remove an excess thickness of the base body and a portion of the cladding portion.

In one aspect, a method for producing a rotor blade comprises: a base body production process of forming a base body having an excess thickness portion in the rotor blade; and a process of forming an erosion shield on a blade body in the method for forming an erosion shield according to claim 8.

In one aspect, a cladding by welding apparatus comprises: the powder supply head according to claim 7; and a laser processing head that emits a laser, wherein the cladding metal is supplied through the powder supply head while a cladding portion is irradiated with the laser by the laser processing head.

Advantageous Effects of Invention

According to the present invention, the state of supplied cladding metal can be stabilized. Accordingly, cladding by welding can be performed with higher accuracy.

DESCRIPTION OF EMBODIMENTS

Hereinafter, an appropriate embodiment of the present invention will be described in detail. The present invention is not limited by the embodiment. In a case where a number of embodiments are present, a combination of the embodiments is also included.

Figure 1:
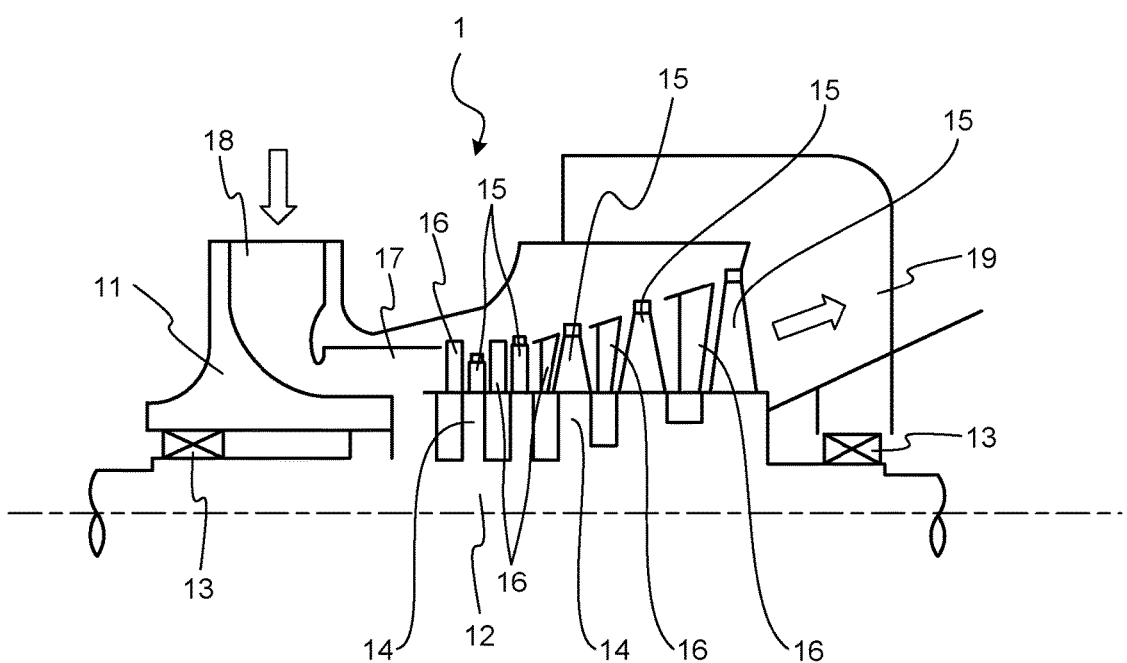
FIG. 1 is a schematic configuration diagram of a steam turbine provided with a rotor blade.

FIG. 1 is a schematic configuration diagram of a steam turbine provided with a rotor blade according to an embodiment. Hereinafter, the gist of a structure of a steam turbine 1 according to the embodiment will be described with reference to FIG. 1.

As illustrated in FIG. 1, in the steam turbine 1, a casing 11 has a hollow shape, and a rotor 12 as a rotating shaft is rotatably supported by a plurality of bearings 13. In the casing 11, rotor blades 15 and stator vanes 16 are disposed. A plurality of the rotor blades 15 are arranged and fixed to the outer circumference of a disk-shaped rotor disk 14, which is formed on the rotor 12, along a circumferential direction thereof. A plurality of the stator vanes 16 are arranged and fixed to the inner wall of the casing 11 along a circumferential direction thereof. The rotor blades 15 and the stator vanes 16 are alternately disposed along the axial direction of the rotor 12.

In addition, in the casing 11, the rotor blades 15 and the stator vanes 16 are disposed such that a steam passage 17 through which steam passes is formed. The steam passage 17 has a steam supply port 18 formed as an inlet to which the steam is supplied and a steam exit port 19 formed as an outlet from which the steam exits toward the outside.

Next, the gist of a process of the steam turbine 1 will be described with reference to FIG. 1. Steam supplied to the steam passage 17 from the steam supply port 18 of the steam turbine 1 expands while passing through the stator vanes 16 and becomes high-speed steam flow. The high-speed steam flow that passes through the stator vanes 16 is blown toward the rotor blades 15 and rotates the plurality of rotor blades 15 and the rotor 12 having the rotor blades 15 attached thereto. For example, a generator or the like is connected to the rotor 12, and as the rotor 12 rotates, the generator is driven and power is generated. The steam that passes through parts of the steam passage 17 where the stator vanes 16 and the rotor blades 15 are disposed exits from the steam exit port 19 toward the outside.

Figure 2:
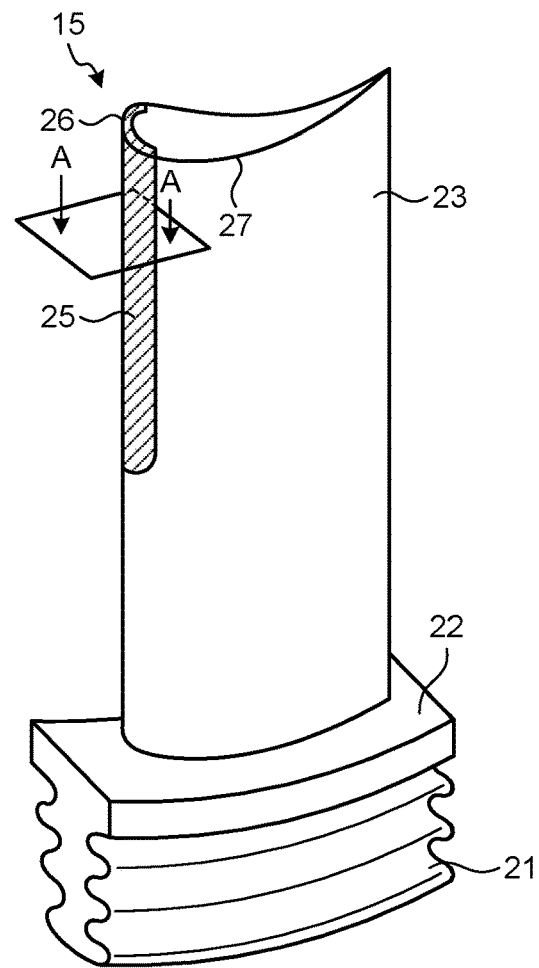
FIG. 2 is a perspective view illustrating a schematic configuration of an embodiment of the rotor blade.
Figure 3:
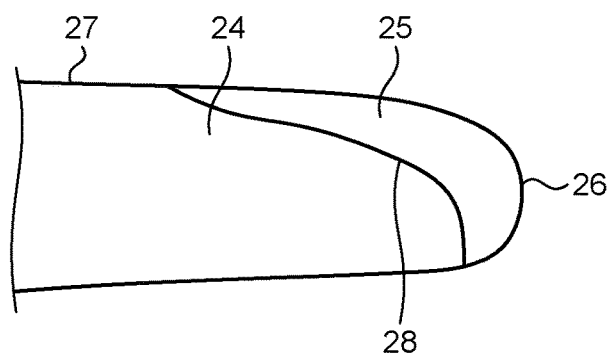
FIG. 3 is a sectional view taken along A-A plane of FIG. 2.

FIG. 2 is a schematic view illustrating the rotor blade of the embodiment. FIG. 3 is a sectional view taken along A-A plane of FIG. 2. The structure of the rotor blade 15 of the embodiment will be described with reference to FIGS. 2 and 3. As illustrated in FIG. 2, the rotor blade 15 includes a blade root portion 21, a platform 22, and a blade portion 23. The blade root portion 21 is embedded into the rotor disk 14 such that the rotor blade 15 is fixed to the rotor disk 14. The platform 22 is a curved plate-shaped member formed integrally with the blade root portion 21. The base end portion of the blade portion 23 is fixed to the platform 22, and the tip end portion thereof extends toward the inner wall surface of the casing 11. There may be a case where the blade portion 23 is twisted along a blade length direction thereof. In addition, the rotor blade 15 may be provided with a shroud fixed to the tip end portion of the blade portion 23.

The shroud is a member that may come into contact with the shroud of an adjacent rotor blade 15 to fix the rotor blade 15 or may suppress vibration of the rotor blade 15.

As illustrated in FIGS. 2 and 3, in the rotor blade 15, an erosion shield 25 is formed on a portion of the surface of a blade body 24. The erosion shield 25 is formed at the leading edge portion of the rotor blade 15, which is the upstream side of the steam flow when the rotor blade 15 rotates and the steam flow occurs, that is, a tip end 26 and a portion of a blade surface 27 on the tip end 26 side. The boundary line between the blade body 24 and the erosion shield 25 becomes a boundary 28. The erosion shield 25 may also be provided only in a predetermined range on a side distant from the platform 22 in an extension direction of the rotor blade 15, that is, in a direction away from the platform 22 of the blade portion 23. That is, the erosion shield 25 may also be formed only in a portion on a side that is radially outward side during rotation. As the erosion shield 25, for example, a cobalt-based alloy with high wear resistance such as Stellite (registered trademark) primarily containing cobalt may be used. The erosion shield 25 may be formed by performing cladding processing through laser welding of an object material (for example, Stellite (registered trademark)) to the surface of the blade body 24. In addition, the blade body 24 is formed of a chromium-based alloy or the like.

Figure 4:
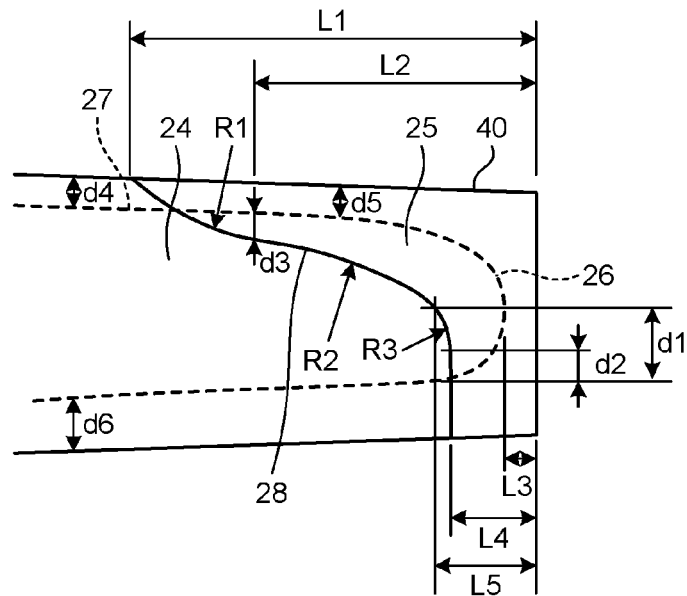
FIG. 4 is an explanatory view for explaining the shape of an erosion shield and a method for forming the same.
Figure 5:
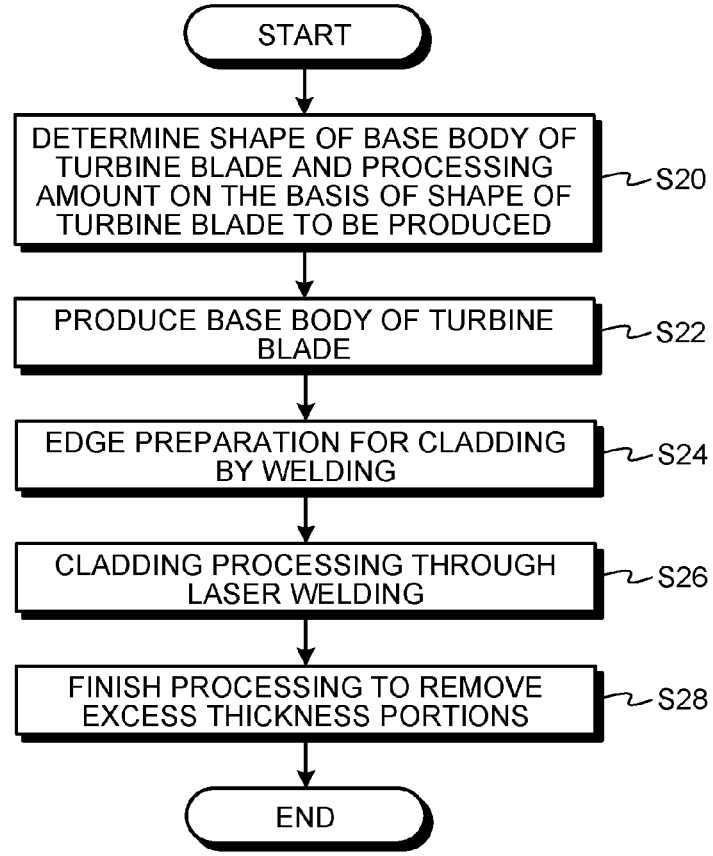
FIG. 5 is a flowchart illustrating an example of the method for producing a rotor blade.
Figure 6:
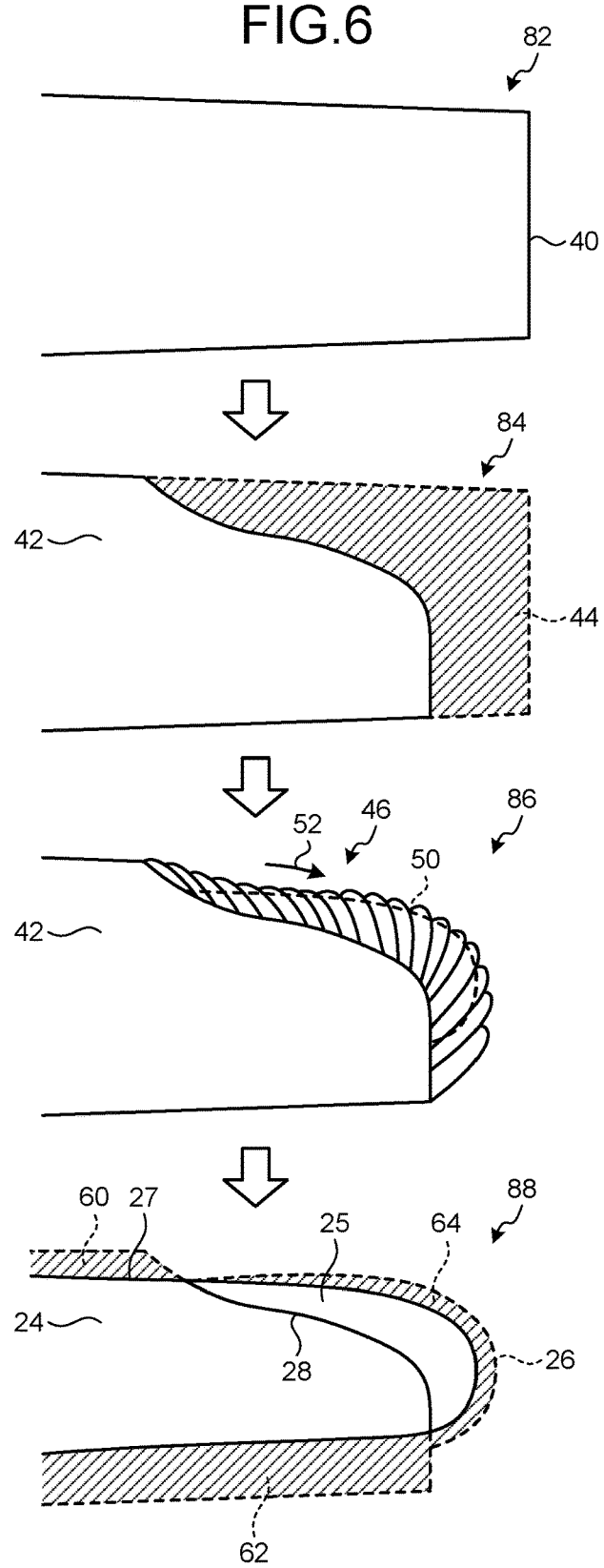
FIG. 6 is a schematic view illustrating an example of a method for forming an erosion shield in the method for producing a rotor blade.
Figure 7A:
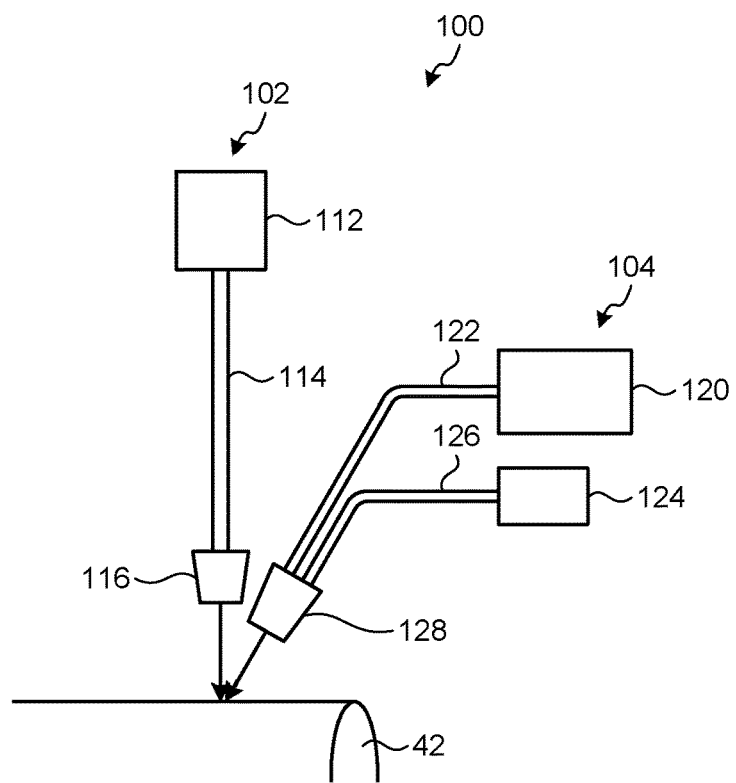
FIG. 7A is a schematic view illustrating a schematic configuration of a cladding by welding apparatus.
Figure 7B:
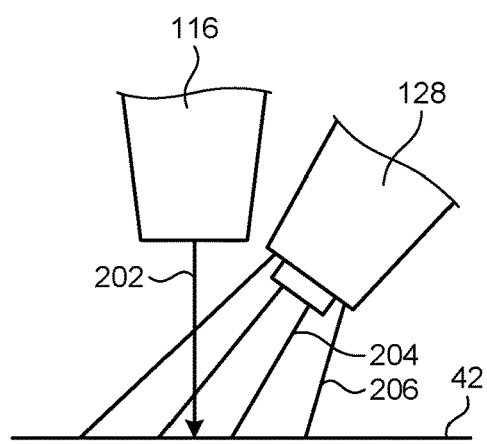
FIG. 7B is a partial enlarged view illustrating the schematic configuration of the cladding by welding apparatus.
Figure 8:
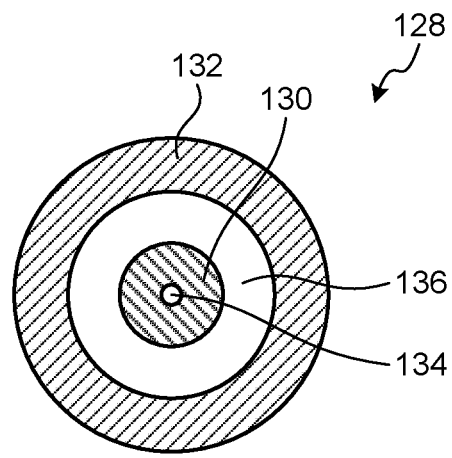
FIG. 8 is a front view illustrating a schematic configuration of a powder supply head.
Figure 9:
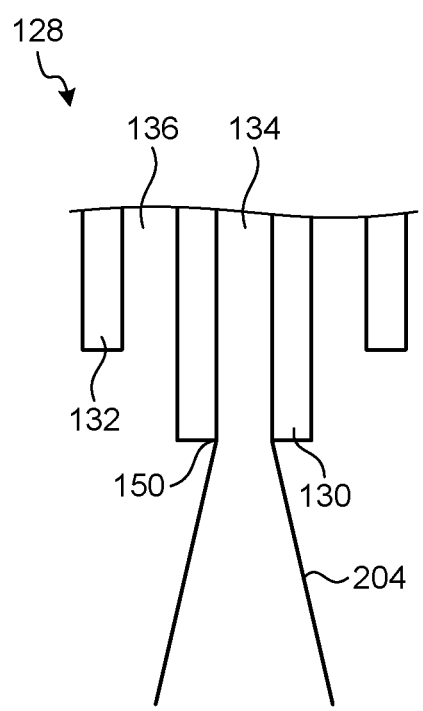
FIG. 9 is a sectional view illustrating the schematic configuration of the powder supply head.
Figure 10:
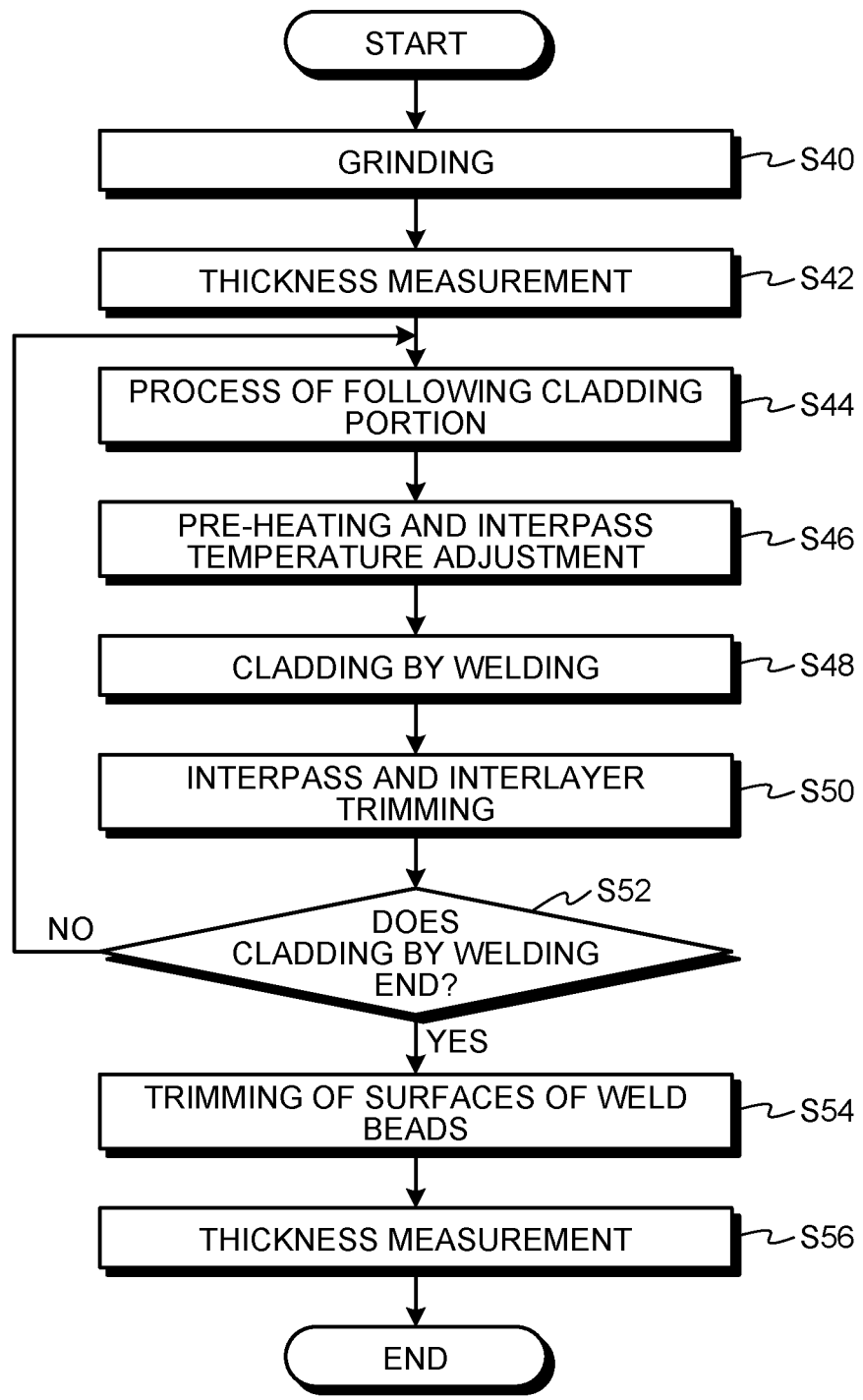
FIG. 10 is a flowchart illustrating an example of a processing operation of cladding by welding.

Next, a more detailed shape of the erosion shield, a method for forming the erosion shield, and a method for producing the rotor blade including the method will be described with reference to FIGS. 4 to 10. FIG. 4 is an explanatory view for explaining the shape of the erosion shield and a method for forming the same. FIG. 5 is a flowchart illustrating an example of the method for producing the rotor blade. FIG. 6 is a schematic view illustrating an example of the method for forming the erosion shield in the method for producing the rotor blade. FIG. 7A is a schematic view illustrating a schematic configuration of a cladding by welding apparatus. FIG. 7B is a partial enlarged view illustrating the schematic configuration of the cladding by welding apparatus. FIG. 8 is a front view illustrating a schematic configuration of a powder supply head. FIG. 9 is a sectional view illustrating the schematic configuration of the powder supply head. FIG. 10 is a flowchart illustrating an example of a processing operation of cladding by welding.

As illustrated in FIG. 4, in the rotor blade 15, the boundary 28 is formed by forming an edge for forming the erosion shield 25 from a base body 40 which is to be formed into the blade body 24. Thereafter, a material for forming the erosion shield 25 is formed on the boundary 28 through cladding processing (cladding by welding), and thereafter, an excess thickness of the cladding portion and an excess thickness of the base body 40 are removed such that the tip end 26, the blade surface 27, and a surface on the side opposite to the blade surface 27 are formed.

Here, the boundary 28 has a shape that becomes close to the surface on the side opposite to the blade surface 27 as moving from an end portion on the blade surface 27 side toward the end portion of the tip end 26. In addition, the boundary 28 is formed to include a curve (first curve) R1 which is convex toward the inside of the blade body 24 at the end portion on the blade surface 27 side, a curve (second curve) R2 which is disposed closer to the tip end 26 side than the first curve R1 and is convex toward the outside of the blade body 24, a curve (third curve) R3 which is disposed closer to the tip end 26 side than the second curve R2 and is convex toward the outside of the blade body 24, and a straight line which is disposed between the third curve R3 and the surface on the side opposite to the blade surface 27. In the boundary 28 of the embodiment, the first, second, and third curves R1, R2, and R3 are smoothly connected. In the boundary 28 of the embodiment, the radius of curvature of the first curve R1 is smaller than that of the second curve R2. In addition, in the boundary 28, the radius of curvature of the third curve R3 is smaller than that of the first curve R1.

As an example of each shape of the rotor blade 15 of the embodiment, the radius of curvature of the first curve R1 is 6.5 mm, the radius of curvature of the second curve R2 is 10.0 mm, and the radius of curvature of the third curve R3 is 2.5 mm.

In the boundary 28, the distance d1 between the contact between the second curve R2 and the third curve R3 and the surface on the side opposite to the blade surface 27 is 2.3 mm, and the distance d2 of the straight line disposed between the third curve R3 and the surface on the side opposite to the blade surface 27 is 0.7 mm. In the rotor blade 15, the distance d3 between the blade surface 27 and the contact between the first curve R1 and the second curve R2 is 0.8 mm. The distances d4 and d5 between a surface of the base body 40 on the blade surface 27 side and the blade surface 27 are 1.0 mm. The distance d6 between a surface of the base body 40 on the side opposite to the blade surface 27 side and the surface of the rotor blade 15 on the side opposite to the blade surface 27 side is 2.0 mm.

In addition, the distance L1 from the end portion of the base body 40 on the tip end 26 side to the end portion of the boundary 28 on the blade surface 27 side becomes 12.5 mm, and the distance L2 from the end portion on the tip end 26 side to the contact between the first curve R1 and the second curve R2 becomes 9.0 mm. The distance L3 from the end portion of the base body 40 on the tip end 26 side to the end portion of the erosion shield 25 on the tip end 26 side becomes 1.0 mm. The distance L4 from the end portion of the base body 40 on the tip end 26 side to the end portion of the third curve R3 on the tip end 26 side becomes 2.7 mm. The distance L5 from the end portion of the base body 40 on the tip end 26 side to the contact between the second curve R2 and the third curve R3 becomes 3.2 mm.

In the rotor blade 15, since the shape of the boundary 28 between the blade body 24 and the erosion shield 25 is a shape that becomes close to the surface on the side opposite to the blade surface 27 as moving from the end portion of the blade surface 27 side toward the end portion of the tip end 26 and includes the first curve R1 and the second curve R2, the erosion shield performance of the erosion shield 25 can be enhanced. In addition, the generation of defects of the erosion shield 25 in the blade body 24 can be suppressed, and the hardness of the erosion shield 25 can be increased (hardened). That is, since the erosion shield 25 formed by the cladding processing through laser welding and the blade body 24 have the above-described relationship and the cladding metal (metal of the erosion shield 25) is diluted with the base metal components (components of the blade body 24), the hardness of the erosion shield 25 is not increased (hardened), and the deterioration in performance can be suppressed. In addition, since the cladding metal is diluted with the base metal components, the initiation of cracking in the metal of the erosion shield 25 can be suppressed. Furthermore, the generation of welding defects such as lack of fusion between the erosion shield 25 and the blade body 24 and blowholes can be suppressed.

In the embodiment, although the first curve R1 and the second curve R2 come into contact with each other, a straight line portion may also be provided between the first curve R1 and the second curve R2. In addition, in the embodiment, a curve may also be provided between the third curve R3 and the surface on the side opposite to the blade surface 27. Here, in the boundary 28, it is preferable that the first, second, and third curves R1, R2, and R3 are smoothly connected and thus the radii of curvature thereof are increased. As described above, by increasing the radius of curvature of each of the curves of the boundary 28, variation in the thickness of the erosion shield 25 in a direction along the boundary 28 can be smoothened and thus the performance of the erosion shield 25 can be enhanced.

In the rotor blade 15, the distance d3 is shorter than the difference between the distance L4 and the distance L3. That is, in the erosion shield 25, the tip end 26 side is thicker than the blade surface 27 side. Accordingly, while the thickness of the tip end 26 side on which erosion is more likely to occur and a reduction in thickness is large is increased, the thickness of the blade surface 27 side with a small reduction in thickness can be decreased.

The distances d4 and d5 between the surface of the base body 40 on the blade surface 27 side and the blade surface 27, that is, the distance of an excess thickness portion on the blade surface 27 side are set to 1 mm. Since the distance of the excess thickness portion on the blade surface 27 side is set to 1 mm, processing can be efficiently performed. The distance thereof may be 1 mm or more or may be great.

The distance d6 between the surface of the base body 40 on the side opposite to the blade surface 27 side and the surface of the rotor blade 15 on the side opposite to the blade surface 27 side, that is, the distance of an excess thickness portion at the surface on the side opposite to the blade surface 27 side is set to 2 mm. Since the distance of the excess thickness portion at the surface on the side opposite to the blade surface 27 side is set to 2 mm, processing can be efficiently performed. The distance thereof may be 2 mm or more or may be great.

Next, the method for producing the rotor blade will be described with reference to FIGS. 5 and 6. In the method for producing the rotor blade, on the basis of the shape of a turbine blade (rotor blade) to be produced, the shape of the base body 40 of the turbine blade and a processing amount are determined (Step S20). That is, as illustrated in FIG. 4 described above, the shape of the set base body 40, the distance thereof at each position, and the like are determined. In addition, the processing amount and a processing order are determined on the basis of the shape.

In the method for producing the rotor blade, when processing conditions are determined, the base body 40 of the turbine blade is produced on the basis of the determined conditions (Step S22). That is, in the method for producing the rotor blade, the base body 40 which is a processing object 82 illustrated in FIG. 6 is produced. The base body 40 has a shape before the boundary 28 is formed, and in the shape, the excess thickness portions and a region closer to the tip end side than the boundary 28 remain. The base body 40 is produced through casting. For example, in a set of upper and lower dies processed to have the shape of the base body 40, a forging stock (for example, stainless steel) heated to a temperature of a recrystallization temperature or higher is put, and hot die forging is performed. When the hot die forging ends, a forging having the shape of the base body 40 is formed. Regarding the produced base body 40, after the formed forging in a high-temperature state is cooled, unnecessary parts (burr) are removed, and a heat treatment is performed on the forging so that residual stress generated in the forging during the pre-process (forging process) and thermal stress generated in the forging during the cooling process are relaxed. Accordingly, the base body 40 is produced.

In the method for producing the rotor blade, when the base body 40 is produced, cladding by welding edge preparation is performed (Step S24). That is, edge preparation is performed on the processing object 82 in FIG. 6 such that a portion 44 of a base body 42 is removed and a processing object 84 is formed. Accordingly, a portion of the base body 42 on the tip end side becomes a curve along the boundary 28.

In the method for producing the rotor blade, after the cladding by welding edge preparation is performed, cladding processing through laser welding is performed (Step S26). That is, cladding by welding is performed on the processing object 84 in FIG. 6 such that a cladding portion 46 is formed on the base body 42 and a processing object 86 is formed. The cladding portion 46 is formed of a metal (cladding metal) that becomes the erosion shield 25 and is formed in a range including a region 50 where the erosion shield 25 is formed. In addition, cladding processing is performed such that each pass is carried out in the extension direction of the rotor blade 15, that is, a direction perpendicular to FIG. 6. In a case where one pass of the cladding processing is performed and the subsequent pass of the cladding processing is performed, a processing position moves in the direction of an arrow 52. That is, the cladding processing is performed from the end portion side of the region 50 on the blade surface 27 side to the surface on the side opposite to the blade surface 27 with a gradual movement toward the tip end 26 side.

In the method for producing the rotor blade, since a surface of the base body 42 on which the cladding portion 46 is formed is the curve along the boundary 28, an increase in the thickness of the region 50 be suppressed, and at each position, the cladding metal for one pass (one layer) can be formed. That is, the cladding portion 46 can be prevented from being formed through multi-layer cladding by welding such that a region with a reduced hardness can be prevented from being exposed to the surface. Here, in the method for producing the rotor blade, by causing the thickness of the region 50 to be 2 mm or less, one layer can be formed at each position of the cladding portion 46. The region with a reduced hardness is a region where the base metal is incorporated into the cladding metal and is thus a region in which the performance (erosion resistance) of the erosion shield 25 obtained by the cladding metal is degraded.

It is preferable that the cladding portion 46 has a dilution of 10% or less with the base metal (the material of the base body 42). In the method for producing the rotor blade, although described later, a dilution of 10% or less with the base metal (the material of the base body 42) can be achieved by forming the cladding portion 46 through the cladding processing using a laser. In the method for producing the rotor blade, since the surface of the base body 42 on which the cladding portion 46 is formed is the curve along the boundary 28, penetration of the cladding metal (the metal of the cladding portion 46, and the metal that becomes the erosion shield 25) can be prevented. Accordingly, the dilution with the base metal (the material of the base body 42) can be more reliably caused to be 10% or less. The cladding portion 46 is formed such that adjacent weld beads, that is, portions formed of adjacent passes overlap. In addition, it is preferable that the weld beads are formed such that in a case where the weld beads come into contact with the base body 42, the weld beads have more contact with the other weld beads than the base body 42. The cladding processing through the laser welding will be described later.

In the method for producing the rotor blade, after the cladding processing is performed, finish processing is performed to remove excess thickness portions (Step S28). That is, finish processing is performed on the processing object 86 in FIG. 6, and as illustrated by the processing object 88, an excess thickness portion 60 on the blade surface 27 side, an excess thickness portion 62 at the surface on the side opposite to the blade surface 27, and an excess thickness portion 64 of the cladding portion 46 are cut off. Accordingly, the rotor blade 15 including the blade body 24 and the erosion shield 25 is formed. Thereafter, necessary heat treatments (for example, a solutionizing treatment and an aging treatment) are performed on the rotor blade 15 such that necessary mechanical properties are imparted to the rotor blade 15.

Next, the cladding processing through the laser welding in Step S26 will be described in more detail with reference to FIGS. 7A, 7B, and 10. First, a schematic configuration of a cladding by welding apparatus 100 which performs the cladding processing through the laser welding will be described with reference to FIGS. 7A and 7B. As illustrated in FIG. 7A, the cladding by welding apparatus 100 includes a laser irradiation device 102 and a powder supply device 104. The cladding by welding apparatus 100 further includes, in addition to the above configuration, a position adjustment mechanism, a mechanism that moves a relative position with respect to the base body 42, a mechanism that performs a process of following a cladding portion, and the like.

The laser irradiation device 102 includes a light source 112, an optical fiber 114, and a laser processing head 116. The light source 112 is a light-emitting source that outputs a laser. The optical fiber 114 guides the laser output from the light source 112 to the laser processing head 116. The laser processing head 116 outputs the laser guided by the optical fiber 114. As illustrated in FIG. 7B, the laser processing head 116 faces the cladding portion of the base body 42 and irradiates the cladding portion with a laser 202.

The powder supply device 104 includes a powder supply source 120, a powder supply line 122, an air supply source 124, an air supply line 126, and a powder supply head 128. The powder supply source 120 is a supply source that supplies the cladding metal. The powder supply source 120 feeds the cladding metal in the form of a mixed flow with air or the like to the powder supply line 122. The powder supply line 122 supplies the mixed flow of the cladding metal and air supplied from the powder supply source 120 to the powder supply head 128. The air supply source 124 supplies an inert gas (for example, nitrogen or argon) which is a shield gas for the cladding portion, in the embodiment, 99.999% nitrogen gas. The air supply line 126 supplies the shield gas supplied from the air supply source 124 to the powder supply head 128.

As illustrated in FIG. 8, the powder supply head 128 is a double tube nozzle in which an inner circumference side tube 130 and an outer circumference side tube 132 disposed at the outer circumference of the inner circumference side tube 130 are disposed concentrically. In the powder supply head 128, a region enclosed by the inner circumference of the inner circumference side tube 130 becomes a flow passage 134. The flow passage 134 is a circle including the center point of the concentric circles. In the powder supply head 128, a region enclosed by the inner circumferential surface of the outer circumference side tube 132 and the outer circumferential surface of the inner circumference side tube 130 becomes a flow passage 136. The flow passage 136 has a ring shape. The powder supply head 128 sprays the mixed flow (powder) 204 of the cladding metal and air supplied via the powder supply line 122 from the flow passage 134 and sprays a shielding air 206 supplied via the air supply line 126 from the flow passage 136. As illustrated in FIG. 7B, the powder supply head 128 faces the cladding portion of the base body 42 and sprays the powder 204 and the shielding air 206 onto the cladding portion.

Here, the powder 204 sprayed from the flow passage 134 is sprayed at a predetermined spread angle as illustrated in FIG. 9. In addition, in the powder supply head 128, an end surface (spray port) 150 of the inner circumference side tube 130 on the spraying side is a surface perpendicular to the center axis (extension direction) of the inner circumference side tube 130. That is, the end surface 150 of the inner circumference side tube 130 is not chamfered.

The cladding by welding apparatus 100 supplies the powder 204 while irradiating the cladding portion of the base body 42 with the laser 202 such that the cladding metal contained in the powder 204 is welded to the base body 42. In addition, the cladding by welding apparatus 100 sprays the shielding air 206 onto the cladding portion such that the atmosphere of the cladding portion achieves a predetermined atmosphere. Specifically, the concentration of oxygen at the cladding portion can be controlled.

In the cladding by welding apparatus 100, since the end surface 150 of the powder supply head 128 has a shape that is not chamfered, the spread angle of the powder 204 can be allowed to be constant. That is, when the end surface 150 of the powder supply head 128 is chamfered, the spread angle of the powder 204 is changed by the chamfered state, and thus the state of the powder supplied toward the cladding portion is changed by the powder supply head 128. Contrary to this, in the powder supply head 128 of the embodiment, since the end surface 150 of the powder supply head 128 has a shape that is not chamfered, the shape of the end surface 150 of the powder supply head 128 can have the same shape, and the occurrence of individual variation can be prevented. Accordingly, the spread angle of the powder 204 can be allowed to be constant, and thus the powder (the cladding metal) can be stably supplied to the cladding portion.

Next, an example of operations of the cladding processing through the laser welding will be described with reference to FIG. 10. The process illustrated in FIG. 10 can be executed by automatic control using a program or the like.

In the method for producing the rotor blade, grinding is performed (Step S40) to treat the surface of a region on which the edge preparation is performed. By performing grinding, the cladding metal welded through the cladding by welding enters a state of being easily welded to the surface (boundary) of the base body 42. In the method for producing the rotor blade, after the grinding is performed, thickness measurement (Step S42) is performed. That is, in the method for producing the rotor blade, the shape of a region where the erosion shield 25 is to be formed is measured.

In the method for producing the rotor blade, after the thickness measurement is performed, a process of following the cladding portion is performed (Step S44). By spraying the cladding metal while emitting the laser, positions where weld beads are to be provided are specified. Accordingly, each path on which the head and the base body 42 are moved relative to each other is adjusted.

In the method for producing the rotor blade, after the following process is performed, pre-heating and interpass temperature adjustment are performed (Step S46). In the embodiment, heating is primarily performed or cooling is performed as necessary so as to cause the base body 42 to reach a predetermined temperature in a range of 50° C. or higher and 100° C. or lower. In the method for producing the rotor blade, after the preheating and temperature adjustment are performed, the cladding by welding is performed (Step S48). Specifically, one pass of the cladding by welding is performed using the cladding by welding apparatus 100.

In the method for producing the rotor blade, after the cladding by welding is performed, interpass and interlayer trimming is performed (Step S50). Specifically, flux, dirt, and the like adhered to the surface of the cladding portion 46 and the like are removed. In the method for producing the rotor blade, after the trimming is performed, it is determined whether or not the cladding by welding ends (Step S52). That is, it is determined that all the set passes of the cladding by welding are performed and the cladding portion 46 can be formed. In the method for producing the rotor blade, in a case where it is determined that the cladding by welding does not end (No in Step S52), the method returns to Step S44, and the processes after the following process are performed to perform the subsequent pass of the cladding by welding.

In the method for producing the rotor blade, in a case where it is determined that the cladding by welding ends (Yes in Step S52), trimming of the surfaces of the weld beads is performed (Step S54). Specifically, flux, dirt, and the like adhered to the surface of the cladding portion 46 and the like are removed. In the method for producing the rotor blade, when thickness measurement is thereafter performed (Step S56) to measure the shape of the cladding portion 46, the main processes end.

In the method for producing the rotor blade, by performing the cladding processing through the laser welding in the above-described processes (cladding processing), processing can be performed with high accuracy, and the generation of defects and the like can be suppressed. In the method for producing the rotor blade, by performing the processes illustrated in Steps S40, S46, S50, and S54, processing accuracy can be increased and defects can be suppressed. However, these processes may not be necessarily performed.

In addition, in the embodiment, the following process is performed for each pass. However, the following process may be performed only before the first pass of the cladding by welding. In this case, the shape of the weld bead formed in each pass is calculated through computation, and on the basis of the shape, a following position is determined. At this time, it is preferable that the cladding portion is acquired by a measuring instrument and on the basis of the result, feedback control is performed. Accordingly, the occurrence of a positional deviation of the cladding portion can be prevented. A measurement position may be on the upstream side of the cladding portion.

In addition, it is preferable that in the cladding by welding apparatus 100, the laser is at about 90 degrees with respect to the flat surface of the cladding portion of the base body and the tangent line connecting a convex portion and a convex portion. Since the laser is at about 90 degrees with respect to the flat surface of the cladding portion of the base body or the tangent line connecting the convex portion and the convex portion close to the cladding portion (for example, a convex portion of the weld bead and a convex portion of the base body), cladding defects can be suppressed, and the incorporation of the base metal into the cladding metal can be suppressed.

In the cladding by welding apparatus 100, the cladding portion may be oscillated. For example, while the powder is supplied to the cladding portion in a band shape, laser weaving may be performed at a high speed in a width direction (a direction orthogonal to the passes). Here, a high speed is a speed at which the energy density distribution of the laser at the cladding portion does not have a V shape but has a rectangular shape and thus a portion diluted with incorporated base metal is thinned. Regarding the weaving in the embodiment, weaving is performed at a frequency of tens of Hz to hundreds of Hz. Accordingly, the energy density distribution can be flattened, and a portion melted by the laser can be thinned and widened.

Figure 11:
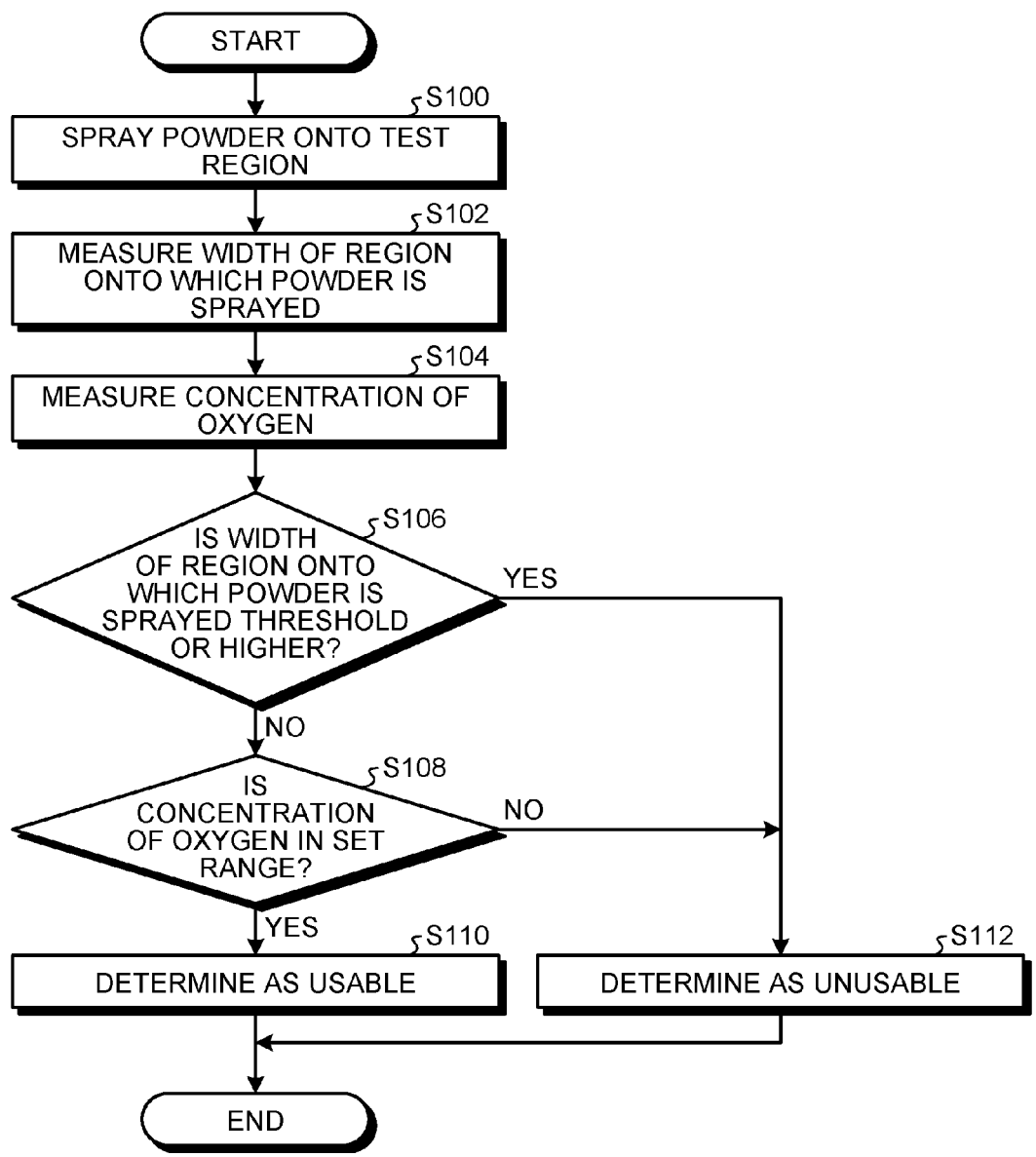
FIG. 11 is a flowchart illustrating an example of a management operation of the powder supply head.
Figure 12:
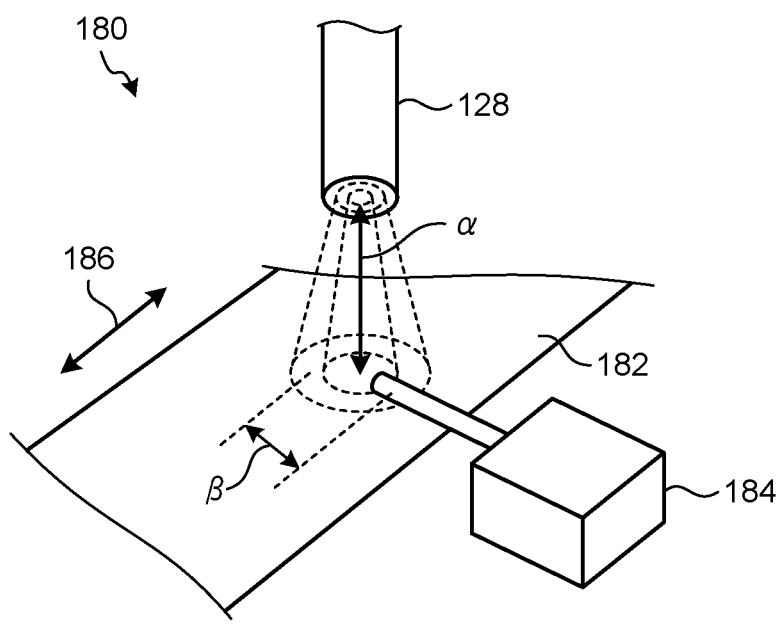
FIG. 12 is an explanatory view for explaining an example of the management operation of the powder supply head.

Next, a management method of the powder supply head will be described with reference to FIGS. 11 and 12. In the cladding by welding apparatus 100 of the embodiment, the end surface 150 of the inner circumference side tube 130 of the powder supply head has a shape that is not chamfered. However, there may be cases where the shape of the inner circumferential surface of the tube 130 varies while the cladding metal is supplied as powder. The cladding by welding apparatus 100 of the embodiment executes the processes illustrated in FIGS. 11 and 12 and manages the state of the powder supply head. FIG. 11 is a flowchart illustrating an example of a management operation of the powder supply head. FIG. 12 is an explanatory view for explaining an example of the management operation of the powder supply head. A timing at which the process illustrated in FIG. 11 is executed is not particularly limited. The process may be executed while cladding processing is performed, while the powder supply head is mounted, while the apparatus is started up, or in a case where a process such as maintenance is set.

In the management method of the powder supply head, a powder is sprayed onto a test region (Step S100). Specifically, as illustrated in FIG. 12, a test unit 180 is installed on the cladding portion of the cladding by welding apparatus 100. The test unit 180 includes a test member 182 and an oxygen concentration measuring device 184. The test member 182 is a flat member such as a flat plate and is disposed at a position distant from the powder supply head 128 by a distance α. The test member 182 acts as a test region to which the powder is sprayed from the powder supply head 128. The test member 182 is provided with a material having adhesion on a surface that faces the powder supply head 128. For example, an adhesive is applied onto the surface of the test member 182 that faces the powder supply head 128. Accordingly, the test member 182 can hold the powder (cladding metal) sprayed from the powder supply head 128 at the adhered position. The oxygen concentration measuring device 184 measures the concentration of oxygen in the test region (for in the vicinity of the test region) onto which the powder is sprayed from the powder supply head 128. It is preferable that the oxygen concentration measuring device 184 allows a measurement terminal that measures the concentration of oxygen to be movable and be present in a region through which the powder sprayed from the powder supply head 128 does not pass while the concentration is not measured.

In the test unit 180, by moving the powder supply head 128 and the test member 182 in a direction of an arrow 186, a position on the test member 182 that the powder sprayed from the powder supply head 128 reaches is moved in one direction and becomes a line that has a width of β in a direction perpendicular to the arrow 186 and receives the powder.

In the management method of the powder supply head, using the test unit 180 as described above, the powder is sprayed onto the test region and a line segment is formed by the powder on the test region. In the management method of the powder supply head, when the line segment is formed on the test region, the width of the region onto which the powder is sprayed, that is, the width β is measured (Step S102), and the concentration of oxygen in the test region onto which the powder is sprayed is measured (Step S104).

In the management method of the powder supply head, when the width and the concentration of oxygen of the region are measured, it is determined whether or not the width of the region onto which the powder is sprayed is a threshold (allowance) or higher (Step S106). The threshold is a preset value. For example, in a case where the distance α is 13 mm, the diameter of the inner circumference side tube 130 is 1.2 mm, the feed rate of the cladding metal is 5 g/min, the flow rate of a carrier gas that carries the cladding metal is 3 l/min or higher and 4 l/min or lower, the width β becomes 7 mm. In the management method of the powder supply head, in a case where it is determined that the width β is the threshold or higher (Yes in Step S106), the process proceeds to Step S112. In the management method of the powder supply head, in a case where it is determined that the width β is less than the threshold (No in Step S106), it is determined that the concentration of oxygen is in a set range (Step S108). In the management method of the powder supply head, in a case where it is determined that the concentration of oxygen is in the set value (Yes in Step S108), it is determined that the powder supply head as an object is usable (Step S110), and the main process ends. In the management method of the powder supply head, in a case where it is determined that the concentration of oxygen is not in the set value (No in Step S108), or in a case where Yes is determined in Step S106, unusable is determined (Step S112), and the main process ends. In the management method of the powder supply head, it is preferable that the determination result is displayed on a monitor or is output through a speaker as a sound to inform a worker of the result.

In the management method of the powder supply head, as described above, the spread of the powder sprayed from the powder supply head is detected, and on the basis of the result thereof, whether or not the powder supply head is usable is determined such that variation in the shape of the nozzle caused by wear and the like during use can be perceived. Therefore, the amount and density of the powder supplied to a head cladding portion can be maintained in predetermined ranges. Accordingly, variation in welding conditions can be suppressed and stable processing can be performed. In the embodiment, since cladding by welding is performed by the powder supply head managed by the management method of the powder supply head, a cladding portion and an erosion shield which have a small amount of defects and high hardness can be formed.

In the management method of the powder supply head, as described above, the concentration of oxygen is detected, and on the basis of the result thereof, whether or not the powder supply head is usable is determined such that whether or not processing conditions are appropriate can be detected. Accordingly, variation in welding conditions can be suppressed and stable processing can be performed. In the embodiment, since cladding by welding is performed by the powder supply head managed by the management method of the powder supply head, a cladding portion and an erosion shield which have a small amount of defects and high hardness can be formed.

In the management method of the powder supply head, determination is performed by using both the width and the concentration of oxygen of the region onto which the powder is sprayed. However, whether or not the powder supply head is usable can be determined on the basis of only one thereof.

In addition, in the embodiment, the rotor blade in the steam turbine has been described as an object. However, the embodiment is not limited thereto, and for example, may also be applied to a method for producing a rotor blade of another rotary machine such as a gas turbine.

REFERENCE SIGNS LIST

1 STEAM TURBINE
11 CASING
12 ROTOR
13 BEARING
14 ROTOR DISK
15 ROTOR BLADE
16 STATOR VANE
17 STEAM PASSAGE
18 STEAM SUPPLY PORT
19 STEAM EXIT PORT
21 BLADE ROOT PORTION
22 PLATFORM
23 BLADE PORTION
24 BLADE BODY
25 EROSION SHIELD
26 TIP END
27 BLADE SURFACE
28 BOUNDARY
40, 42 BASE BODY
46 CLADDING PORTION
60, 62, 64 EXCESS THICKNESS PORTION
82, 84, 86, 88 PROCESSING OBJECT
100 CLADDING BY WELDING APPARATUS
102 LASER IRRADIATION DEVICE
104 POWDER SUPPLY DEVICE
128 POWDER SUPPLY HEAD

The invention claimed is:

1. A management method of a powder supply head which has a double tube in which an inner circumference side tube that sprays a cladding metal used for cladding by welding using a laser and an outer circumference side tube that is disposed at an outer circumference of the inner circumference side tube and sprays a shielding air overlap concentrically, and supplies the cladding metal to a cladding portion, the method comprising:
a spraying process of spraying the cladding metal from the powder supply head to a test region under set conditions and forming a line segment by the cladding metal sprayed to the test region;
a width measurement process of measuring a width of the cladding metal sprayed onto the test region;
a determination process of, in a case where the measured width of the cladding metal is an allowance or smaller, determining that the powder supply head is usable, and in a case where the measured width of the cladding metal is greater than the allowance, determining that the powder supply head is unusable.

2. The management method of a powder supply head according to claim 1,
wherein, in the inner circumference side tube, an end surface on a side where the cladding metal is sprayed is processed into a surface perpendicular to an axial direction of the inner circumference side tube.

3. The management method of a powder supply head according to claim 1, wherein the test region is provided with an adhesive material.

4. The management method of a powder supply head according to claim 1, further comprising:

an oxygen concentration measurement process of measuring a concentration of oxygen of the test region during the spraying process, wherein in the determination process, in a case where the concentration of oxygen measured in the oxygen concentration measurement process is an allowance or lower, it is determined that the powder supply head is usable, and in a case where the measured concentration of oxygen is higher than the allowance, it is determined that the powder supply head is unusable.

5. A method for forming an erosion shield on at least one of a tip end and a blade surface of a rotor blade body, comprising:

a process of forming a boundary by removing at least a portion of a tip end and an end surface of a base body which is to become the rotor blade;

a process of forming a cladding portion through laser welding on the boundary using a powder supply nozzle which is determined to be usable in the management method of a powder supply head according to claim 1; and a process of performing finish processing to remove an excess thickness portion of the base body and a portion of the cladding portion.

6. A method for producing a rotor blade comprising:

a base body production process of forming a base body having an excess thickness portion in a rotor blade; and a process of forming an erosion shield on a blade body in the method for forming an erosion shield according to claim 5.

7. A powder supply head comprising:

an inner circumference side tube which sprays a cladding metal used for cladding by welding; and an outer circumference side tube that is disposed to overlap concentrically with an outer circumference of the inner circumference side tube and sprays a shielding air, wherein, in the inner circumference side tube, an end surface on a side where the cladding metal is sprayed is a surface perpendicular to an axial direction of the inner circumference side tube.

8. A method for forming an erosion shield on at least one of a tip end and a blade surface of a rotor blade body, comprising:

a process of forming a boundary by removing at least a portion of a tip end and an end surface of a base body which is to become the rotor blade;

a process of forming a cladding portion through laser welding on the boundary using a powder supply nozzle having the powder supply head according to claim 7; and a process of performing finish processing to remove an excess thickness of the base body and a portion of the cladding portion.

9. A method for producing a rotor blade comprising:

a base body production process of forming a base body having an excess thickness portion in the rotor blade; and a process of forming an erosion shield on a blade body in the method for forming an erosion shield according to claim 8.

10. A cladding by welding apparatus comprising:

the powder supply head according to claim 7; and a laser processing head that emits a laser, wherein the cladding metal is supplied through the powder supply head while a cladding portion is irradiated with the laser by the laser processing head.

* * * * *